United States Patent [19]
Kozlovsky et al.

[11] Patent Number: 5,394,414
[45] Date of Patent: Feb. 28, 1995

[54] LASER SYSTEM AND METHOD HAVING A NONLINEAR CRYSTAL RESONATOR

[75] Inventors: William J. Kozlovsky, Sunnyvale; William P. Risk, Mountain View, both of Calif.

[73] Assignee: International Business Machines Corporation, Armonk, N.Y.

[21] Appl. No.: 69,312

[22] Filed: May 28, 1993

[51] Int. Cl.$^6$ .............................................. H01S 3/091
[52] U.S. Cl. ...................... 372/22; 372/92; 372/27
[58] Field of Search .................. 372/21, 22, 32, 27, 372/92, 94, 109

[56] References Cited

U.S. PATENT DOCUMENTS

| | | | |
|---|---|---|---|
| 4,068,190 | 1/1978 | Ferguson | 372/22 X |
| 4,618,957 | 10/1986 | Liu | 372/22 |
| 4,791,631 | 12/1988 | Baumert et al. | 372/22 |
| 4,809,291 | 2/1989 | Byer et al. | 372/22 X |
| 5,038,352 | 8/1991 | Lenth et al. | 372/21 |
| 5,060,233 | 10/1991 | Harder et al. | 372/22 |
| 5,077,748 | 12/1991 | Kozlovsky et al. | 372/22 |
| 5,095,491 | 3/1992 | Kozlovsky et al. | 372/94 |
| 5,111,468 | 5/1992 | Kozlovsky et al. | 372/32 |

FOREIGN PATENT DOCUMENTS

| | | |
|---|---|---|
| 0429319 | 5/1991 | European Pat. Off. . |
| 41-16550 | 5/1991 | Germany . |
| 0415976 | 4/1990 | Japan . |
| 03234073 | 1/1992 | Japan . |
| 03256283 | 2/1992 | Japan . |
| 0415969 | 4/1992 | Japan . |

OTHER PUBLICATIONS

M. Chun, et al., Efficient Generation at 421 nm By Resonantly Enhanced Doubling of GaAlAs Laser Diode Array Emission, Jul. 1989, pp. 218–220.

P. Gunter, Second–Harmonic Generation with GaAlAs Lasers and KNbO Crystals Sep. 1979, pp. 461–463.

A. Ashkin, Resonant Optical Second Harmonic Generation and Mixing, Dec. 1965, pp. 109–121.

T. Baer, et al., THM5 Efficient Frequency Doubling of a Diode Laser, Cleo '89.

G. Dixon, 432 nm Source Based on Efficient Second–Harmonic Generation of GaAlAs Diode–Laser Radiation in a Self–Locking External Resonant Cavity, 1989, pp. 731–733.

R. Drever, et al., Laser Phase and Frequency Stabilization Using an Optical Resonator, Feb. 1983, pp. 97–105.

W. Kozlovsky, et al., Efficient Second Harmonic Generation of a Diode–Laser–Pumped CW Nd:YAG Laser Using Monolithic MgO:LiNbO External Resonant Cavities, Jun. 1988, pp. 913–919.

W. Risk, et al., Noncritically Phase–Matched Frequency Doubling Using 934 nm Dye and Diode Laser Radiation in KTiOPO, Sep. 1989, pp. 1179–1181.

J. Baumert, et al., Generation of Blue CW Coherent Radiation by Sum Frequency Mixing in KTiOPO, Dec. 1987, pp. 2192–2194.

Primary Examiner—Akm E. Ullah
Attorney, Agent, or Firm—Douglas R. Millett

[57] ABSTRACT

A laser system uses a nonlinear crystal ring resonator to produce Type II nonlinear second harmonic generated light. The reflective surfaces of the resonator are oriented to form two closed beam paths for the two fundamental frequency light beams having different orthogonal polarization. The two beam paths overlap along one segment which is parallel to an axis of the nonlinear crystal. Second harmonic generated light is produced along this segment of the beam paths.

41 Claims, 6 Drawing Sheets

LASER SYSTEM AND METHOD HAVING A NONLINEAR CRYSTAL RESONATOR

BACKGROUND OF THE INVENTION

1. Field of the Invention

This invention relates to laser systems and more particularly to laser systems which produce light by frequency doubling or sum-frequency mixing.

2. Description of the Prior Art

Semiconductor diode lasers are of interest for a number of applications such as optical data storage, laser printing, and biochemical analysis. One example is the gallium-aluminum-arsenide (GaAlAs) diode laser which generates laser light in the near-infrared range (750–860 nm in wavelength). In optical data storage systems, the light from the laser diode is focused onto a spot on the optical disk in order to record each bit of data. The spot size is equal to approximately $\lambda/(2*(N.A.))$, where $\lambda$ is the wavelength of the light and (N.A.) is the numerical aperture of the, focusing lens. In typical systems, the (N.A.) is approximately 0.5 and the resulting spot size is approximately 800 nm in diameter.

It is apparent that if the wavelength of the laser light can be cut in half, the diameter of the spot size will also be cut in half and the overall storage density on the optical disk may be quadrupled. Unfortunately, laser diodes which produce light in the blue wavelength range (430 nm in wavelength) are not available.

One technique to convert light to a higher frequency (shorter wavelength) is known as second harmonic generation (SHG). A laser beam at a first frequency is passed through a nonlinear crystal, such as potassium niobate ($KNbO_3$), which produces a second harmonic laser beam (i.e., a beam at twice the frequency of the original laser beam which entered the nonlinear crystal). This SHG technique is discussed in articles by M. K. Chun, et al., Applied Physics Letters, Vol. 55, p. 218, Jul. 17, 1989; and P. Gunter, et al., Applied Physics Letters, Vol. 35, p. 461, Sep. 15, 1979.

However, since the diode laser's output power is low, techniques to improve the second harmonic generation efficiency are required in order to produce a useful and efficient laser system.

One way to increase the efficiency of the SHG scheme is to place an optical resonator or cavity around the nonlinear crystal. The light is reflected back and forth through the crystal inside the resonator in order to generate a substantial amount of the blue light. This technique was originally proposed and demonstrated by Ashkin, et al., IEEE Journal of Quantum Electronics, Vol. QE-2, p. 109, 1966. Other examples include Goldberg, et al., Applied Physics Letters, Vol. 55, p. 218, 1989; and Baer, et al., Conference on Lasers and Electro-Optics, Paper THM5, 1989. Frequency doubling of GaAlAs diode lasers using a build-up cavity containing a nonlinear crystal such as potassium niobate ($KNbO_3$) offers the potential for the design of simple, compact laser systems. For the build up to occur, the external cavity resonance frequency must match the diode laser frequency, and the prior art includes a variety of techniques for achieving this frequency matching (e.g., Dixon, et at., Optics Letters, Vol. 14, p. 731, 1989; R. W. Drever, et al., Applied Physics B, Vol. 31, p. 97, 1983; and W. J. Kozlovsky, et al., IEEE Journal of Quantum Electronics, Vol. 24, p. 913, 1988.)

Heretofore, the nonlinear crystal $KNbO_3$ has been used for resonantly enhanced frequency doubling of GaAlAs laser diodes. Potassium niobate has a large nonlinear coefficient and sufficient birefringence for phasematching of second-harmonic generation at the wavelengths of GaAlAs laser diodes. However, this phasematching is very sensitive to the temperature of the crystal, and this temperature must be precisely controlled to maintain efficient second-harmonic generation.

Nonlinear crystals other than $KNbO_3$ have been shown to have phasematching properties advantageous for generation of blue/green light by frequency upconversion of semiconductor laser diodes. In particular, potassium titanyl phosphate ($KTiOPO_4$, KTP) can be used for second-harmonic generation of 990 nm strained-layer InGaAs laser diodes (e.g., W. P. Risk, et al. Applied Physics Letters, Vol. 55, No. 12, p. 1179, and U.S. Pat. No. 5,060,233 issued Oct. 22, 1991 by Harder, et al.) and has been shown to have broad temperature tolerances in that application. Similarly, sum-frequency mixing in KTP (e.g., J. C. Baumert, et al. Applied Physics Letters, Vol. 51, p. 2192, 1987 and U.S. Pat. No. 4,791,631 issued Dec. 13, 1988) of a wavelength less than 994 nm with a wavelength greater than 994 nm supplied by a combination of GaAlAs and InGaAs lasers can be used to generate virtually any blue/green wavelength between 450 nm and 500 nm.

The nonlinear processes described above in KTP require the presence of two orthogonally polarized infrared lightwaves in order to be efficient. Such interactions are known as Type-II nonlinear interactions. This is in contrast to the case of second-harmonic generation in $KNbO_3$ where only one polarization is required (Type-I nonlinear interaction). Hence, to enhance the efficiency of a Type-II nonlinear interaction requires that two lightwaves having orthogonal polarizations, at the same or different wavelengths, be simultaneously resonated.

Examples of optical resonators include the following: U.S. Pat. No. 5,038,352 by Lenth, et al., issued Aug. 6, 1991; U.S. Pat. No. 5,077,748 by Kozlovsky, et al., issued Dec. 31, 1991; U.S. Pat. No. 5,111,468 by Kozlovsky, et al., issued May 5, 1992; Japanese patent application 04-15976 by Suzuki, et al., published Jan. 21, 1992; Japanese patent application 03-234073 by Yuasa, published Oct. 18, 1991; Japanese patent application 03-256383 by Oka, et at., published Nov. 15, 1991; Japanese patent application 04-15969 by Suzuki, et al., published Jan. 21, 1992; European patent application 429319 by Huigeard, published May 29, 1991; and German patent application DE 4116550 by Tatsuno, et al., published Nov. 28, 1991.

Monolithic resonators have reflective surfaces which are integrally formed on the nonlinear crystals such that the resonating lightwaves never leave the nonlinear crystal. This is highly desirable for reasons of efficiency, stability, and compactness. The preferred configuration in a Type-I nonlinear process is a triangular ring resonator which has a three sided beam path. As used herein, ring resonator refers to a resonator having a closed beam path having at least three segments.

It is difficult to use a monolithic ring resonator to do a Type II nonlinear process because of the phenomenon of bireflection. Bireflection causes light of different orthogonal polarizations to be reflected at different angles. This makes it difficult to direct the different orthogonal components around the same beam path in the resonator. U.S. Pat. No. 5,095,491 by Kozlovsky, et al., issued Mar. 10, 1992, shows a ring resonator which is able to achieve Type II nonlinear process. The reflectors of the resonator are oriented such that they are symmetrical with respect to the crystal axes and therefore the light beams do not experience bireflection. However, this ring resonator has two outputs which result in less power in each beam. In addition, residual blue reflection from the resonator mirrors can affect the total output from the device. What is needed is a ring resonator which solves the bireflection problem and these output problems and achieves high efficiency production of second harmonic generated light in a single beam.

SUMMARY OF THE INVENTION

In a preferred embodiment of the present invention, a monolithic ring resonator comprises a nonlinear crystal having four integral reflecting surfaces. The surfaces create a first beam path for light having a first polarization and a second beam path for light having a second polarization. Each beam path has four leg segments arranged in a crossing pattern shaped as two intersecting triangles. Both beam paths overlap each other along one of the leg segments. This overlapping leg segment is parallel to one of the axes of the nonlinear crystal and second harmonic generated light is produced along this leg segment.

For a fuller understanding of the nature and advantages of the present invention, reference should be made to the following detailed description taken in conjunction with the accompanying drawings.

DESCRIPTION OF THE PREFERRED EMBODIMENTS

Figure 1:
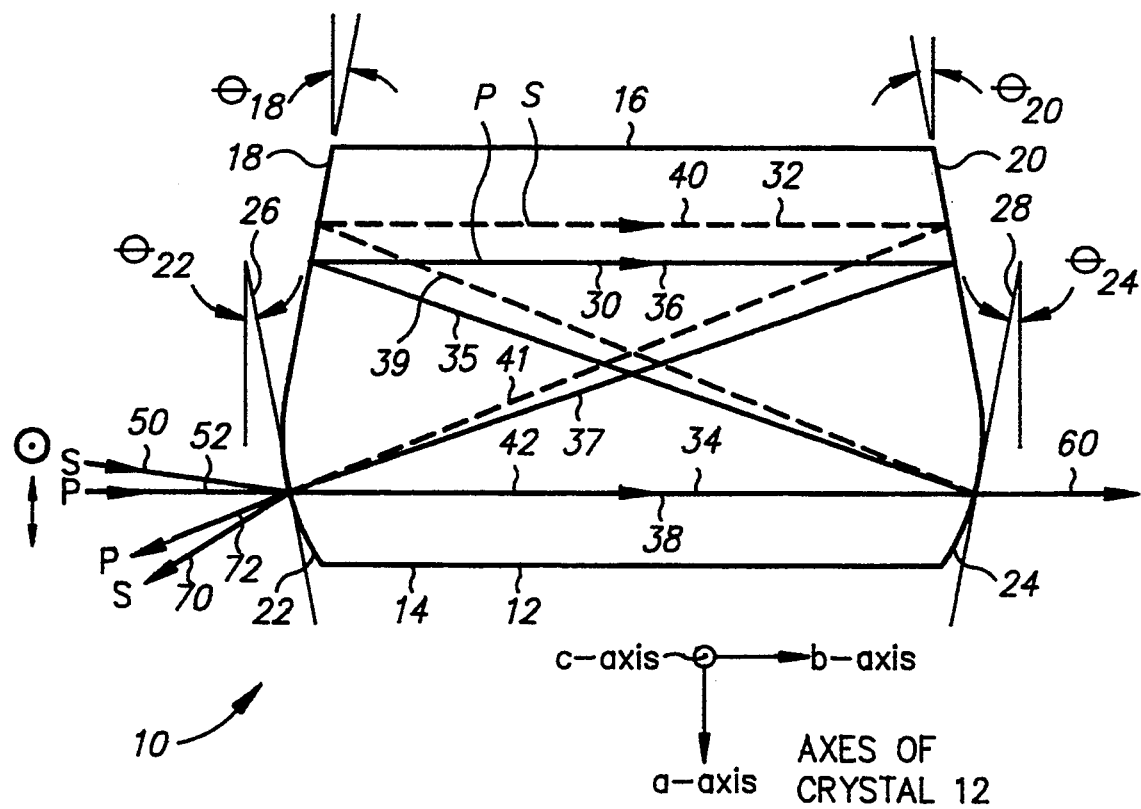
FIG. 1 shows a schematic diagram of the monolithic ring resonator of the present invention.

FIG. 1 shows a nonlinear resonator of the present invention and is designated by the general reference number 10. Nonlinear resonator 10 is fabricated from a nonlinear crystal material 12, such as potassium titanyl phosphate (KTP). Nonlinear crystals have crystalographic axes a, b and c as are known in the art. In the preferred embodiment, using KTP as the nonlinear crystal 12, the resonator is formed with parallel longitudinal surfaces 14 and 16 which are oriented parallel-to the b-c plane of the crystal.

The crystal 12 is shaped to form four reflective surfaces 18, 20, 22 and 24. Surfaces 18 and 20 are preferably flat and are oriented at angles $\theta_{18}$ and $\theta_{20}$, respectively, from the a axis. Surfaces 22 and 24 are preferably curved surfaces and have a radius of curvature or approximately 5 mm in the preferred embodiment. A plane 26 which is tangent to surface 22 at approximately the middle of the surface, is set at an angle $\theta_{22}$ with respect to the a axis. A plane 28 is tangent to surface 24 at approximately the middle of the surface and is set at an angle $\theta_{24}$ with respect to the a axis. Surface 18 is parallel to plane 28 and surface 20 is parallel to plane 26. Reflective surfaces 18, 20, 22 and 24 are covered with dielectric mirror coatings.

The spacing and orientation of the reflective surfaces 18, 20, 22 and 24 is chosen to form two closed beam paths 30 and 32 within the crystal 12. Beam path 30 has four leg segments 34, 35, 36 and 37, and beam path 32 has four leg segments 38, 39, 40 and 41. Leg segments 34 and 38 overlap one another as a combined segment 42.

The beam paths 30 and 32 represent two resonator modes. The mode of beam path 32 comprises light having polarization perpendicular to the plane of the a-b axes (S polarization) along segment 42. The mode of beam path 30 comprises light having polarization parallel to the plane of the a-b axis (P polarization) along segment 42. The radii of curvature of the curved surfaces 22 and 24 are preferably chosen to produce a small beam waste (22 microns at $1/e^2$ beam radius, i.e., the radius of the beam where power equals $1/e^2$ of peak power) for the resonant modes of the beam paths. In a specific embodiment, the radii of curvature of surfaces 22 and 24 are approximately 5 mm, the length of overlapping leg segment 42 is approximately 6 mm and $\theta_{18}$, $\theta_{20}$, $\theta_{22}$, and $\theta_{24}$ are all approximately 7°.

The nonlinear resonator 10 is aligned with an orientation to receive optically incident input fundamental frequency beams 50 and 52. Beam 50 contains S polarized light and beam 52 contains P polarized light. In a preferred embodiment, beams 50 and 52 are approximately 994 nm in wavelength and enter resonator 10 at an angle of 12.3° and 12.9°, respectively, relative to plane 26. The diameters of beams 50 and 52 at the input surface 22 are chosen by spatial mode matching considerations for most efficient excitation of fundamental resonator modes of beam paths 32 and 30, respectively. Spatial mode matching is discussed in more detail in the article, "Laser Beams and Resonators," Applied Optics, Vol. 5, p. 1550, (1966).

The dielectric mirror coatings of surfaces 18, 20, 22 and 24 are designed to maximize the build-up of intensity in the resonator modes of beam paths 30 and 32 when excited by input beams 52 and 50, respectively. The mirror coatings at surfaces 18 and 20 are chosen to be highly reflecting at the fundamental frequency wavelengths corresponding to both modes of the beam paths 30 and 32. The mirror coating at surface 18 is chosen to be highly transmissive and the mirror coating at surface 20 is chosen to be highly reflective at the wavelength corresponding to a second harmonic (blue/green) output beam 60. This is necessary to dispose of any stray second harmonic light that does not pass out of surface 24. The mirror coating at surface 24 is chosen to be highly reflective at the wavelengths corresponding to both modes of the beam paths 30 and 32 and highly transmissive at the wavelength of a second harmonic (blue/green) output beam 60. The reflectivity of the input mirror coating at surface 22 is chosen for optimum coupling of the input beams 50 and 52 to the cavity modes, taking into account both the internal losses of the nonlinear crystal, i.e. round trip loss of approximately 0.5% in a specific embodiment of a total ring path of approximately 24.1 mm length, and the anticipated losses due to the nonlinear interaction. This optimum coupling is known as impedance matching and is described in the article "Efficient Second Harmonic Generation of a Diode-Laser-Pumped Nd:YAG Laser," by W. J. Kozlovsky, et al., IEEE J. Quantum. Electronics, Vol. QE-24, No. 6, p. 913, (1988).

In a preferred embodiment, with 80% spatial mode matching of 50 milliwatt input beams the surface 22 mirror has a reflectivity of 98.9% for the fundamental frequency of beams 50 and 52, and a reflectivity of less than 20% for the frequency of the second harmonic output beam 60. The coatings at surfaces 24 and 18 have a high reflectivity of approximately 99.9% for the frequency of beams 50 and 52, and a reflectivity of less than 20% for the frequency of the second harmonic output beam 60. The mirror coating at surface 20 has a high reflectivity of approximately 99.9% for the frequency of beams 50, 52 and 60.

If each incident beam 50 and 52 is tuned to a resonant frequency of its corresponding resonator mode of beam paths 32 and 30, respectively, the optical power in the modes will build up to a high intensity. In addition, the frequencies $f_1$ and $f_2$ of resonant modes and the frequency $f_3 = f_1 + f_2$ of the generated beam 60 must satisfy the phasematching condition for the nonlinear interaction, $f_1 n_1 + f_2 n_2 = f_3 n_3$, where $f_1$ is the frequency of the light propogating along beam path 30, $f_2$ is the frequency of the light propogating along beam path 32, $f_3$ is the frequency of output beam 60, $n_1$ is the refractive index of the crystal 12 for the mode of beam path 30, $n_2$ is the refractive index of the crystal 12 for mode of beam path 32, and $n_3$ is the refractive index of the crystal 12 for output beam 60.

The operation of resonator 10 may now be understood. Fundamental frequency beams 50 and 52 are coupled into resonator 10 at surface 22. A small portion of beams 50 and 52 do not enter resonator 10 and are reflected as beam 70 and 72, respectively. Beams 50 and 52 resonate inside resonator 10 along beam paths 32 and 30, respectively. Initially, beams 50 and 52 enter resonator 10 along the overlapping leg segment 42. Here the orthogonally polarized beams travel directly along the b axis together and interact with the nonlinear crystal 12 to produce Type II second harmonic generated (SHG) light. The SHG light produced is at twice the frequency of the fundamental frequency beams 50 and 52. For example, in a preferred embodiment, the fundamental frequency beams 50 and 52 are in the range of infrared light and the SHG beam is in the range of blue light. The SHG light exits surface 24 as beam 60.

Not all of the light from fundamental frequency beams 50 and 52 will be converted to SHG light along one pass of leg 42. This remaining fundamental frequency light will be reflected at surface 24. However, due to the bireflection effect, beams 50 and 52 are reflected at slightly different angles. Beam 50 now follows beam path 32 and is reflected at surfaces 18, 20 and 22 before returning to leg 42. Similarly, beam 52 now follows beam path 30 and is reflected at surfaces 18, 20 and 22 before returning to leg 42. As will be explained in more detail below, the surfaces are arranged such that the angular changes due to the bireflection effect are cancelled and the beams are able to follow the same overlapping leg 42 for a portion of their beam paths.

Figure 2:
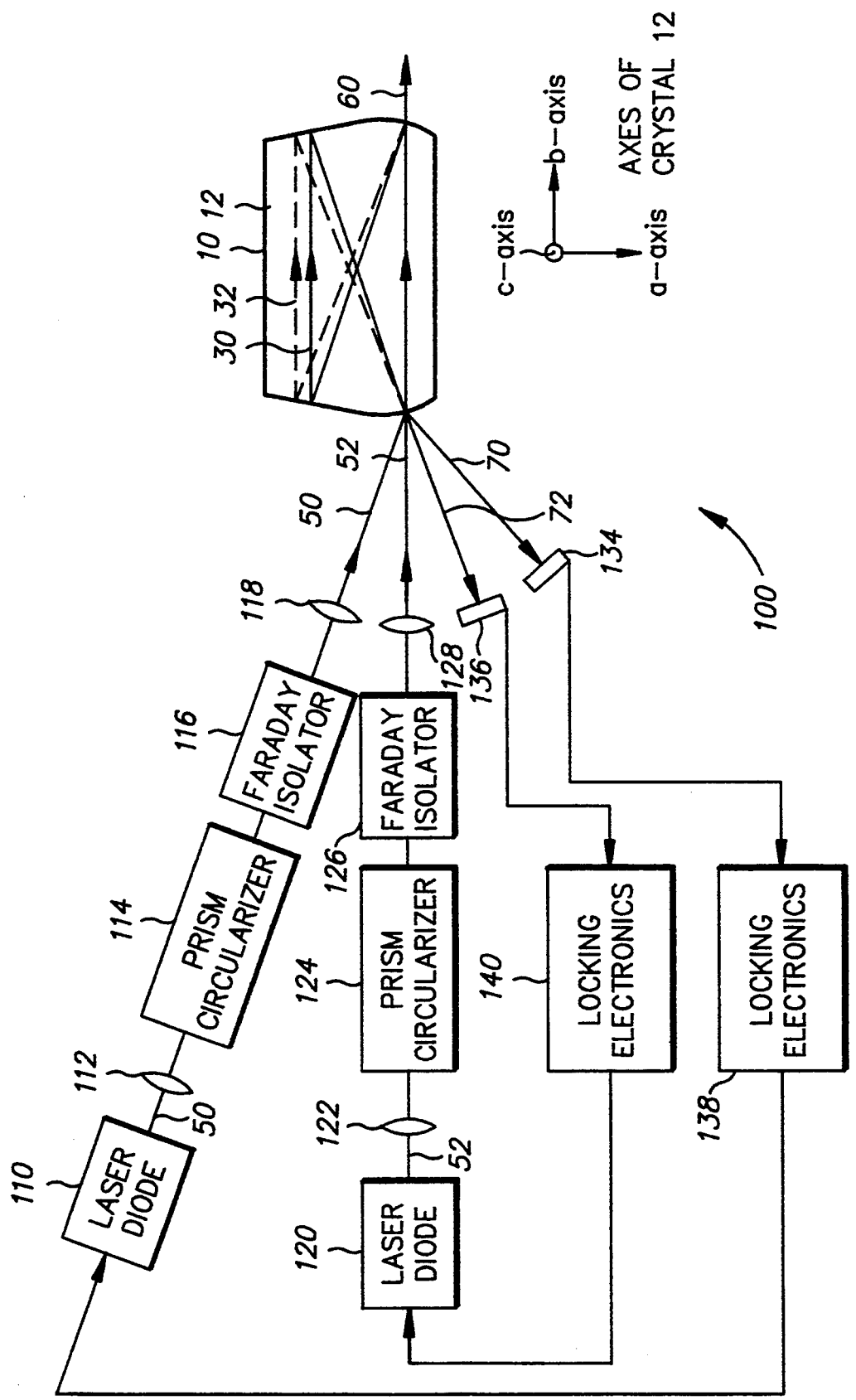
FIG. 2 shows a schematic diagram of a laser system for frequency upconversion of infrared laser diodes using the resonator of FIG. 1.

FIG. 2 shows a laser system 100 using the nonlinear resonator 10. A laser diode 110 generates laser beam 50 which is collimated by a lens 112 and is circularized by a circularizing prism 114. The light 50 is then passed through a Faraday isolator 116. Faraday isolator 116 is used to prevent back-reflected light and scattered light from reaching diode laser 110. A lens 118 couples the light 50 into the fundamental spatial mode of beam path 32. A second laser diode 120 generates laser beam 52 which is collimated by a lens 122 and is circularized by a circularizing prism 124. The light 52 is then passed through a Faraday isolator 126. Faraday isolator 126 is used to prevent back-reflected light and scattered light from reaching diode laser 120. A lens 128 couples the light 52 into the fundamental spatial mode of beam path 30.

In a preferred embodiment, laser diodes 110 and 120 are both strained-layer InGaAs/GaAs laser diodes operating at wavelengths of approximately 994 nm. In this embodiment, the wavelength of output beam 60 is approximately 497 nm. In a another specific embodiment, laser diode 110 is a GaAlAs laser diode operating at a wavelength of 810–820 nm and laser diode 120 is a strained-layer InGaAs laser diode operating at a wavelength of 1040–1070 nm. In this embodiment, the wavelength of the output beam 60 is approximately 455–464 nm.

The frequencies of laser diodes 110 and 120 must be maintained at the resonant frequencies of the modes of beam paths 32 and 30, respectively. In a preferred embodiment, this is done by sensing the beams 70 and 72 reflected from the cavity with optical detectors 134 and 136, respectively. A pair of locking electronic circuits 138 and 140 are connected to detectors 134 and 136, respectively. Circuits 138 and 140 are connected to and control lasers 110 and 120, respectively. Reflected beams 70 and 72 contain FM signals. The FM signals contained in reflected beams 70 and 72 can be used by circuits 138 and 140 to adjust the frequencies of laser diodes 110 and 120 to match the cavity resonance frequencies. This FM locking techniques is taught in W. J. Kozlovsky, et al., Applied Physics Letters, Vol. 56, p. 2291, (1990). Other frequency locking techniques may also be used.

Figure 3A:
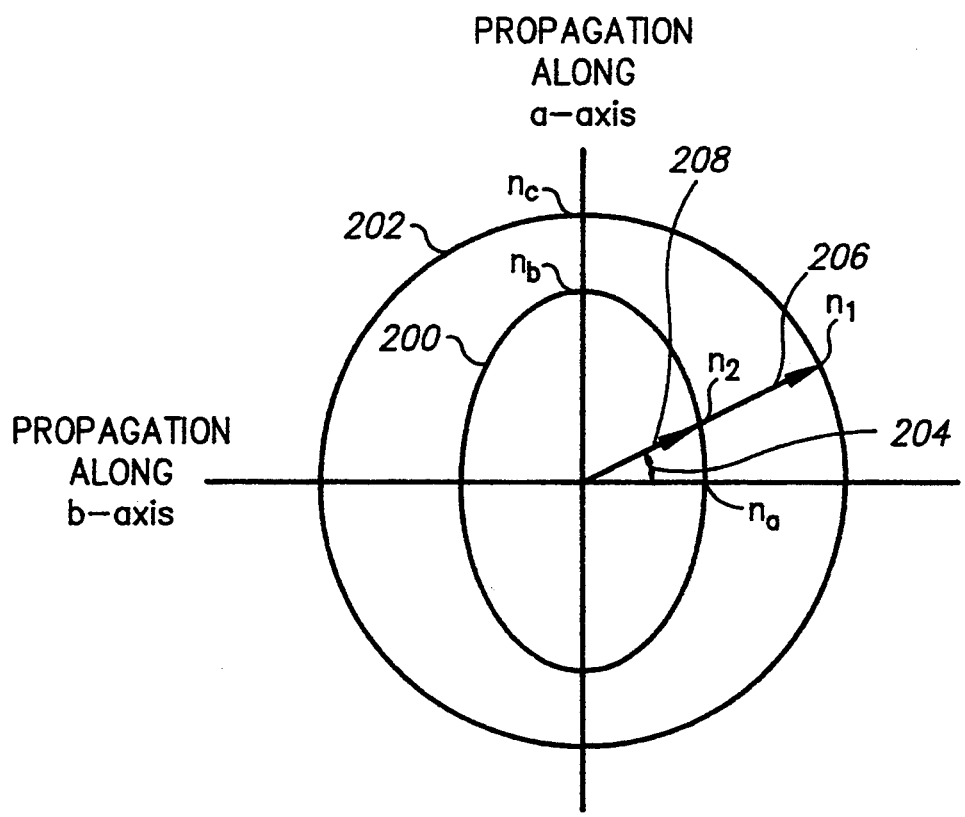
FIG. 3A is a slowness curve which describes the propagation of light in an anisotropic optical crystal.
Figure 3B:
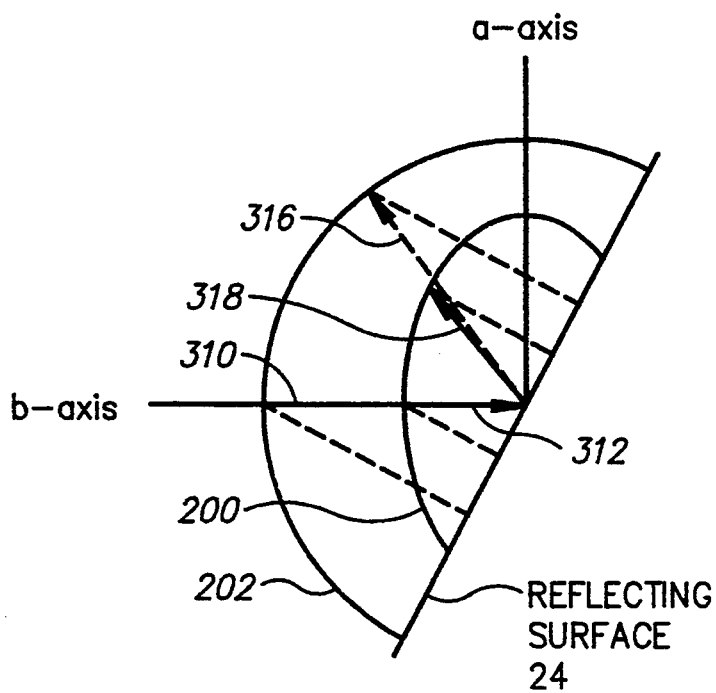
FIG. 3B is a slowness curve which shows the problem of bireflection.
Figure 3C:
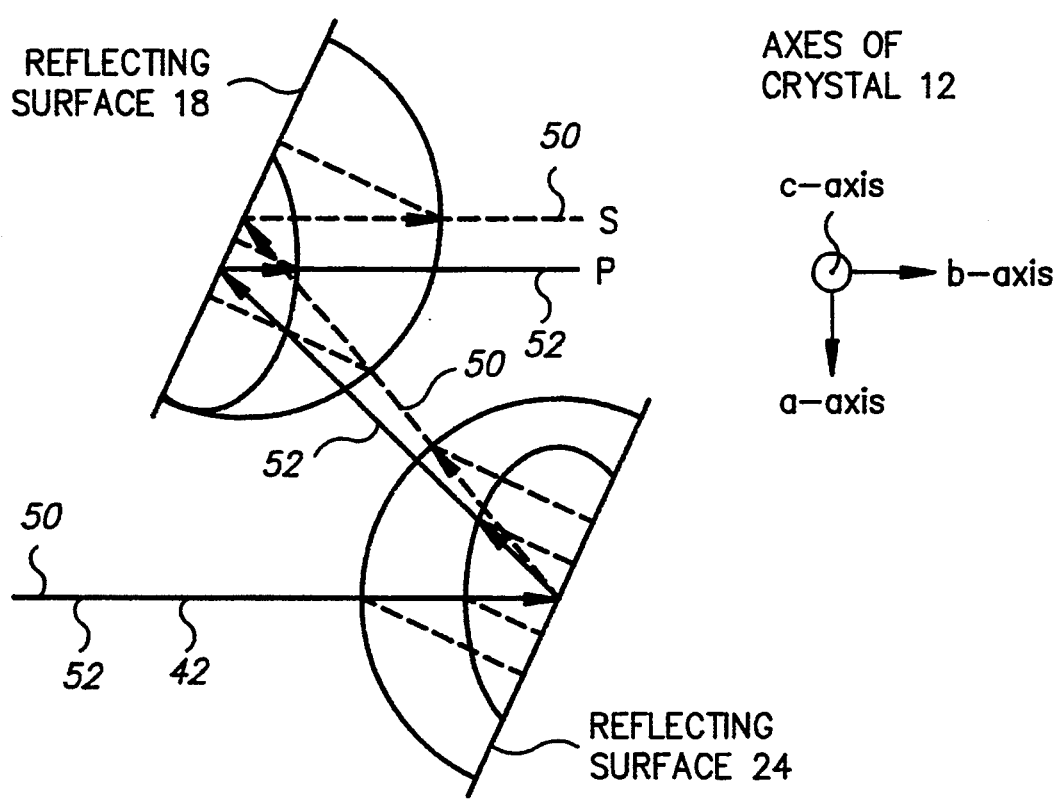
FIG. 3C is a slowness curve which shows how the bireflection problem is solved using the resonator of the present invention.

FIGS. 3A, 3B and 3C are slowness curves which explain the bireflection effect. FIG. 3A shows a slowness curve for the nonlinear material KTP. The curves 200 and 202 depict the refractive index characteristic of a light wave propagating at an angle 204 with respect to the b-axis of the KTP crystal; that is, the curves indicate the speed at which a light wave of a given polarization will travel in a particular direction within the crystal. Curve 200 applies to a lightwave polarized parallel to the a-b plane (P polarization); curve 202 applies to a lightwave polarized perpendicular to the a-b plane (S polarization). If the light wave is polarized perpendicular to the a-b plane, it will have refractive index $n_1$ as given by the length of arrow 206 (the distance from origin to curve 202). If the light wave is polarized parallel to the a-b plane, it will have refractive index $n_2$ as given by the length of arrow 208 (the distance from the origin to curve 200). As a specific example, if angle 204 is 90°, the light waves are propagating along the a-axis of the crystal. The light wave polarized parallel to the a-b plane (P polarization) Will have index of refraction $n_b$ and the light wave polarized perpendicular to the a-b plane (S polarization) will have index of refraction $n_c$.

FIG. 3B shows the case of reflection at surface 24 of resonator 10. Beam 50 with S polarization (polarization perpendicular to the a-b plane) is incident upon reflecting surface 24, and is represented by an arrow 310 oriented in the direction of propagation and with length (the distance from curve 202 to the origin) equal to the refractive index of the wave. Reflecting surface 24 is oriented at an angle to the crystallographic a- and b-axes. Electromagnetic boundary conditions require that the reflected wave travel in such a direction that that its effective speed along the direction of the reflecting surface be the same as that of the incident wave. The effective speed of the wave along the direction of the reflecting surface is represented by the projection of arrow 310 onto the reflecting surface 24. Therefore, for the wave represented by arrow 310, this condition is satisfied by a reflected wave propagating in the direction of arrow 316. The length of arrow 316 is from the origin to curve 202. Beam 52 with P polarized (polarized parallel to the a-b plane) is represented by arrow 312 and is incident upon reflecting surface 24. The length of arrow 312 is from curve 200 to the origin. In this case, the wave reflected from the boundary must travel in the direction of arrow 318 in order for the effective speed along the direction of the reflecting surface 24 to be the same as that of the incident wave. The length of arrow 318 is from the origin to curve 200. In this case, it can be seen that even though both waves are incident upon the reflecting surface 24 at the same angle, they are reflected from the surface at two different angles.

FIG. 3C shows the slowness curve for reflecting surfaces 18 and 24. As stated above, beams 50 and 52 experience bireflection at surface 24 and are reflected at different angles. Surface 18 is oriented parallel to the tangent 28 of surface 24 such that when beams 50 and 52 strike surface 24, they will be reflected back in the same direction parallel to one another and to the b-axis. In effect, surface 18 reverses the angular displacement caused by surface 24. However, beams 50 and 52 are still spatially displaced. In order to return beams 50 and 52 to the same beam path, the process is reversed. Reflective surfaces 20 and 22 are oriented at reverse angles to surfaces 18 and 24, respectively. One way to visualize this is to think of surface 20 as surface 18 after being rotated around the a-axis. Similarly, surface 22 is like surface 24 after being rotated around the a-axis. Surfaces 20 and 22 are parallel to one another and the beams 50 and 52 essentially reverse the process shown in FIG. 3C and return to the same beam path.

While generation of blue-green light using KTP and GaAlAs and strained-layer InGaAs diode lasers has been used in specific embodiments of the present invention, generation of other wavelengths using other nonlinear crystals and other lasers are possible. Other nonlinear crystals such as lithium niobate, lithium equilibrated lithium niobate, lithium potassium niobate, lithium iodate, potassium niobate, KTA, barium borate, LBO and periodically-poled KTP and lithium niobate may have Type-II nonlinear interactions requiring input beams of two orthogonal polarizations. The fundamental wavelengths required for these interactions can be generated from various laser systems, including GaAlAs laser diodes, strained-layer InGaAs laser diodes, InGaAsP laser diodes, AlGaInP laser diodes, single-frequency titanium:sapphire and dye laser systems and other single frequency solid-state lasers such as Nd:YAG lasers.

Figure 4:
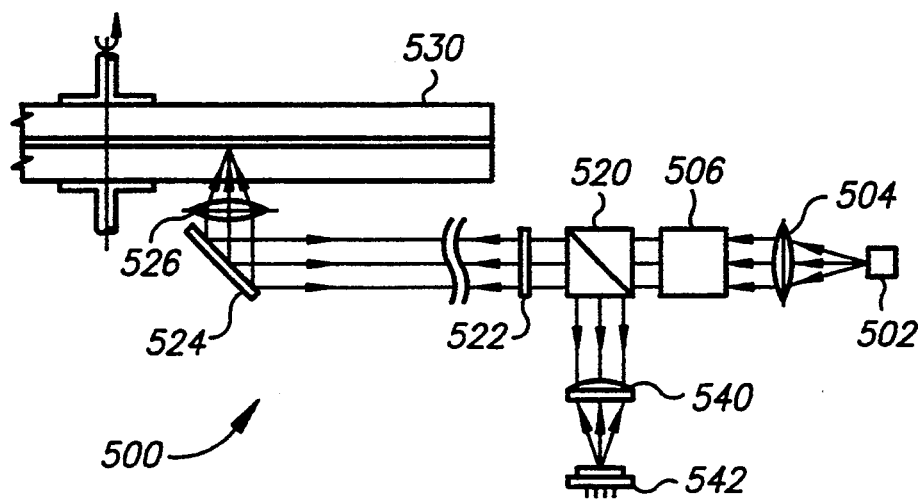
FIG. 4 shows a schematic diagram of a phase-change storage system of the present invention.

FIG. 4 shows a phase change optical data storage system 500 which uses a laser system 502. Laser system 100 may be used for system 502. The light from system 502 is collimated by a lens 504 and passes to a circularizing optical element 506. Element 506 emits light having a circular cross-sectional beam pattern. Element 506 may be a prism.

The light then passes through a polarizing beam splitter 520 and a quarter-wave plate 522. The light is reflected off of a mirror 524 and focused by a lens 526 onto an optical recording medium 530. Medium 530 may be a phase change type of optical recording medium.

The light reflected from medium 530 returns through lens 526, is reflected off of mirror 524, passes through plate 522 to beam splitter 520. Reflected light is then diverted by beam splitter 520 to an astigmatic lens 540. Lens 540 focuses the reflected light onto an optical detector 542. The recorded spots of the medium 530 have different reflectivities and these differences are detected by optical detector 542 as data one and zeros. Detector 542 also provides focus and tracking signals.

Figure 5:
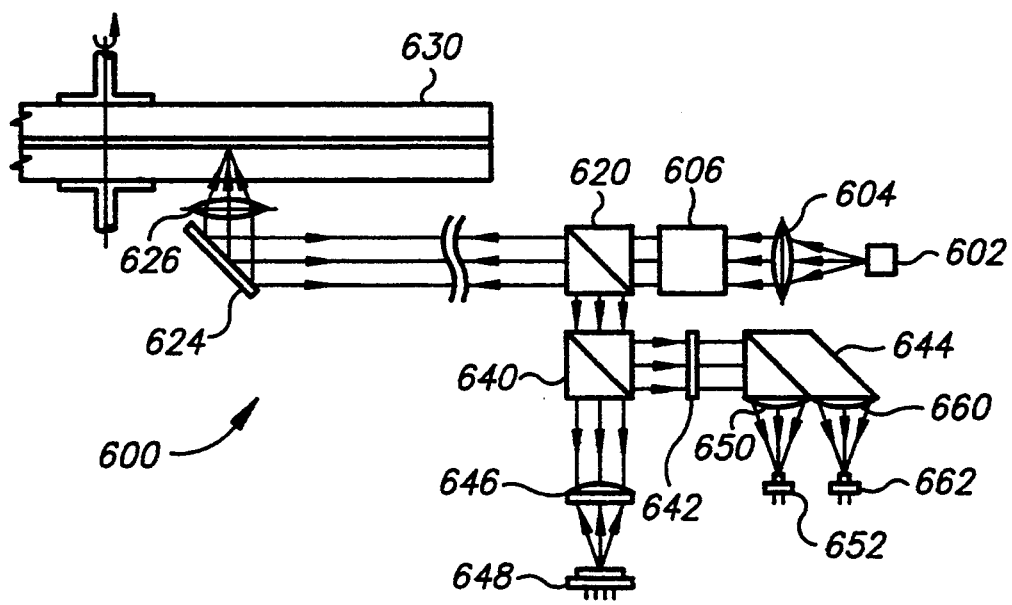
FIG. 5 shows a schematic diagram of a magneto-optic storage system of the present invention.

FIG. 5 shows a magneto-optic data storage system 600 which uses a laser system 602. Laser system 100 may be used for system 602. The light from system 602 is collimated by a lens 604 and passes to a circularizing optical element 606. Element 606 emits light having a circular cross.-sectional beam pattern. Element 606 may be a prism.

The light then passes through leaky polarizing beam splitter 620. Beam splitter 620 has reflectivities of Rp greater than zero and Rs approximately equal to 1 (s and p represent the orthogonal polarization components of the light). The light is then reflected off of a mirror 624 to a lens 626 and is focused onto an optical recording medium 630. Medium 630 may be a magneto-optic type of optical recording medium.

The light reflected from medium 630 returns through lens 626, reflects off of mirror 624, and enters beam splitter 620. Beam splitter 620 diverts the reflected light to an amplitude beam splitter 640. Reflected data light is diverted to a half-wave plate 642 and to a beam splitter 644. Reflected light of other amplitudes passes straight through beam splitter 640. This light is focused by an astigmatic lens 646 to a quad detector 648 to produce tracking and focus signals.

The medium 630 has recorded spots having either an up or down magnetic domain. The light reflected off of these spots has its plane of polarization rotated one way or the other depending upon the direction of the magnetic domain of the spot. Beam splitter 644 separates the reflected light depending upon which way the plane of polarization has been rotated. The separated beams go to a lens 650 and an optical detector 652 or to a lens 660 and an optical detector 662. The difference in output signals of output signals of detectors 652 and 662 are the data ones and zeros. A more detailed explanation of optical disk drive systems is given in "Gradiant-Index Optics and Miniature Optics," SPIE, Vol. 935, p. 63 (1988) by Glenn T. Sincerbox.

Figure 6:
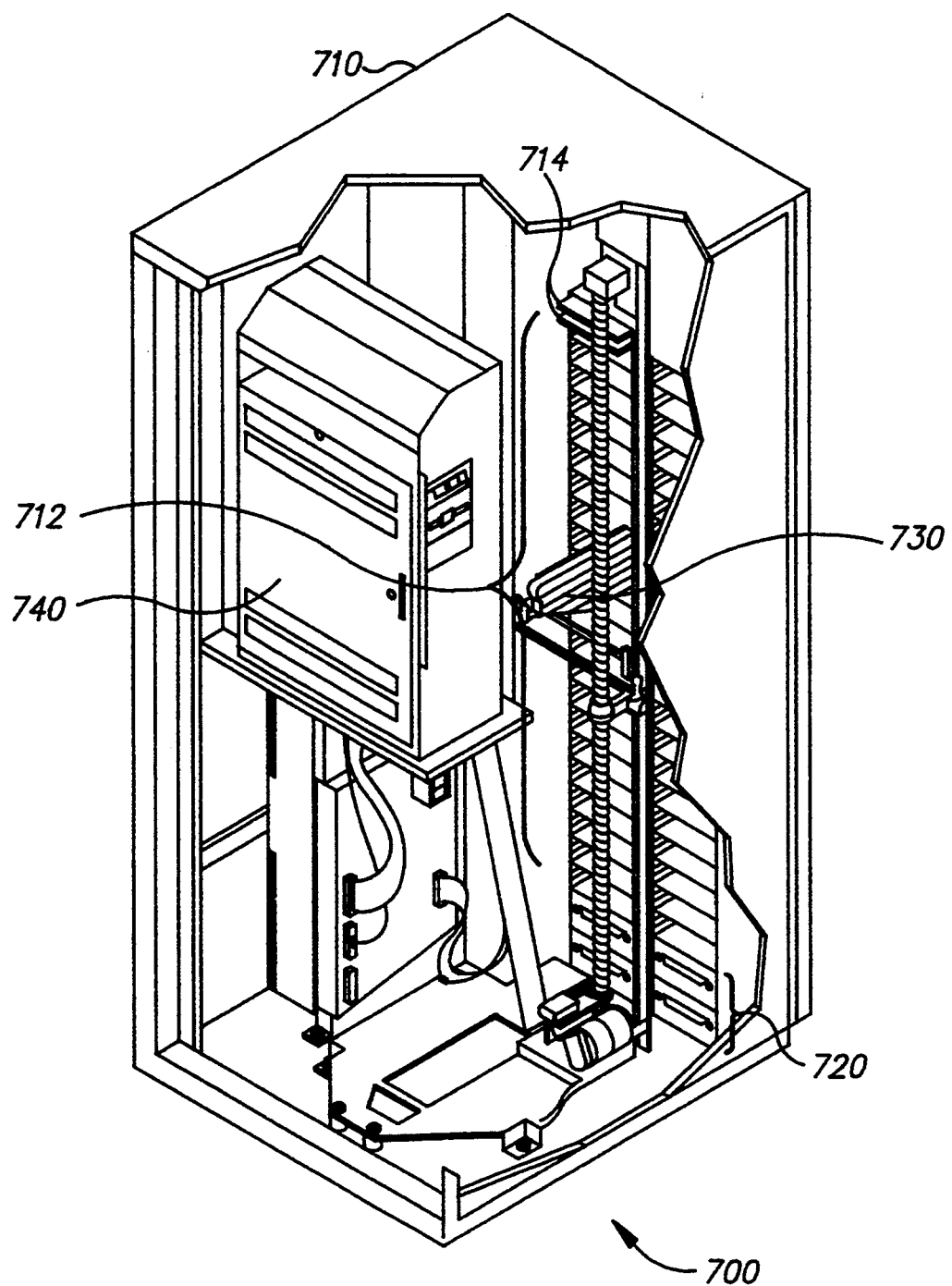
FIG. 6 shows a schematic diagram of an optical storage library system of the present invention.

FIG. 6 is a schematic diagram of an optical data storage library system of the present invention and is designated by the general reference number 700. System 700 has an outer housing 710. A plurality of optical disk cartridge storage bays 712 hold a plurality of optical disk cartridges 714. Cartridges 714 hold optical disks similar to disks 530 and 630 of systems 500 and 600, respectively. A plurality of optical disk drives 720 are located below the storage bays 712. Drives 720 may be similar to system 500 or 600, depending upon which type of optical disks are used in the cartridges 714.

A cartridge moving device 730 is mounted beside the storage bays 712 and drives 720. The device 730 has a grasping mechanism which is able to move cartridges 714 from one of the storage bays 712 to one of the drives 720 and back again. A control unit 740 is electrically connected to the moving device 730 and the drives 720.

The operation of systems 700 may now be understood. When it is desired to read or write data, the control unit 740 selects the storage bay which contains the desired cartridge 714. The control unit 740 causes moving device 730 to grasp the selected cartridge and load it into one of the drives 720. The drive 720 then reads the data from or writes the data to the disk inside the cartridge 714. The moving device 730 then removes the cartridge from the drive 720 and returns it to the appropriate storage bay 712. The cartridge 714, moving device 730 and control unit 740 may be similar to those currently used in the IBM Optical Library Product 3995.

The advantages of the present invention may now be understood. It has been discovered that the efficiency of Type-II nonlinear processes such as frequency doubling and sum-frequency mixing may be enhanced using a monolithic crystal ring resonator in which four mirrors define the path of light within the resonator. This invention is of particular use for generation of blue/green light using a KTP crystal fashioned into a monolithic resonator for second-harmonic generation and sum-frequency mixing of GaAlAs and InGaAs laser diodes. An efficient output of blue/green light is produced which is especially suited to optical storage systems and optical libraries.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A laser system comprising:
   a nonlinear crystal for receiving a first and a second polarization radiation beams and producing second harmonic radiation; and
   a ring resonator integral to the nonlinear crystal for resonating the first and second polarization radiation beams, the resonator having a plurality of reflecting surfaces which form a first beam path for the first polarization radiation beam and a second beam path for the second polarization radiation beam, wherein a portion of the first and second beam paths overlap along an overlap segment, the beams in the overlap segment having a direction of propagation which is parallel to a crystalographic axis of the nonlinear crystal.

2. The system of claim 1, wherein the first and second polarization radiation beams are produced by diode lasers.

3. The system of claim 1, wherein the nonlinear crystal is a type II nonlinear crystal.

4. The system of claim 1, wherein the nonlinear crystal is comprised of KTP.

5. The system of claim 1, wherein there are four reflective surfaces.

6. The system of claim 1, wherein the first and second beam paths each have four segments and the overlap occurs along one of the segments.

7. The system of claim 1, wherein the first and second beam paths are each shaped as two intersecting triangles.

8. The system of claim 1, wherein the reflective surfaces comprise a first, second, third, and fourth reflective surfaces, the first and second reflective surfaces each having reflective planes which are parallel to one another, and the third and fourth reflective surfaces each having reflective planes which are parallel to one another.

9. The system of claim 1, wherein the reflective surfaces each have reflective planes which are nonparallel to any of the planes containing two of the crystalographic axes of the nonlinear crystal.

10. The system of claim 1, wherein the crystalographic axis is the b axis.

11. A laser system comprising:
    a first radiation source for producing a first radiation beam of a first polarization;
    a second radiation source for producing a second radiation beam of a second polarization different from said first polarization;
    a nonlinear crystal for receiving the first and second polarization radiation beams and producing second harmonic radiation; and
    a ring resonator integral to the nonlinear crystal for resonating the first and second polarization radiation beams, the resonator having a plurality of reflecting surfaces which form a first beam path for the first polarization radiation beam and a second beam path for the second polarization radiation beam, wherein a portion of the first and second beam paths overlap along an overlap segment, the beams in the overlap segment having a direction of propagation which is parallel to a crystalographic axis of the nonlinear crystal.

12. The system of claim 11, wherein the first and second polarization radiation beams are produced by diode lasers.

13. The system of claim 11, wherein the nonlinear crystal is a type II nonlinear crystal.

14. The system of claim 11, wherein the nonlinear crystal is comprised of KTP.

15. The system of claim 11, wherein there are four reflective surfaces.

16. The system of claim 11, wherein the first and second beam paths each have four segments and the overlap occurs along one of the segments.

17. The system of claim 11, wherein the first and second beam paths are each shaped as two intersecting triangles.

18. The system of claim 11, wherein the reflective surfaces comprise a first, second, third, and fourth reflective surfaces, the first and second reflective surfaces each having reflective planes which are parallel to one another, and the third and fourth reflective surfaces each having reflective planes which are parallel to one another.

19. The system of claim 11, wherein the reflective surfaces each have reflective planes which are nonparallel to any of the planes containing two of the crystalographic axes of the nonlinear crystal.

20. The system of claim 11, wherein the crystalographic axis is the b axis.

21. A method for frequency conversion of radiation comprising the steps of:
    generating a first radiation beam of a first polarization;

generating a second radiation beam of a second polarization different from said first polarization;

coupling the first and second polarization radiation beams to a nonlinear crystal to produce second harmonic radiation; and resonating the first and second polarization radiation beams inside a ring resonator integral to the nonlinear crystal by reflecting the beams off of a plurality of reflecting surfaces which form a first beam path for the first polarization radiation beam and a second beam path for the second polarization radiation beam, wherein a portion of the first and second beam paths overlap along an overlap segment, the beams in the overlap segment having a direction of propagation which is parallel to a crystalographic axis of the nonlinear crystal.

22. The system of claim 21, wherein the first and second polarization radiation beams are produced by diode lasers.

23. The system of claim 21, wherein the nonlinear crystal is a type II nonlinear crystal.

24. The system of claim 21, wherein the nonlinear crystal is comprised of KTP.

25. The system of claim 21, wherein there are four reflective surfaces.

26. The system of claim 21, wherein the first and second beam paths each have four segments and the overlap occurs along one of the segments.

27. The system of claim 21, wherein the first and second beam paths are each shaped as two intersecting triangles.

28. The system of claim 21, wherein the reflective surfaces comprise a first, second, third, and fourth reflective surfaces, the first and second reflective surfaces each having reflective planes which are parallel to one another, and the third and fourth reflective surfaces each having reflective planes which are parallel to one another.

29. The system of claim 21, wherein the reflective surfaces each have reflective planes which are nonparallel to any of the planes containing two of the crystalographic axis of the nonlinear crystal.

30. The system of claim 21, wherein the crystalographic axis is the b axis.

31. A laser system comprising:
a first radiation source for producing a first radiation beam of a first polarization;
a second radiation source for producing a second radiation beam of a second polarization different from said first polarization;
a nonlinear crystal for receiving the first and second polarization radiation beams and producing second harmonic radiation;
a ring resonator integral to the nonlinear crystal for resonating the first and second polarization radiation beams, the resonator having a plurality of reflective surfaces which form a first beam path for the first polarization radiation beam and a second beam path for the second polarization radiation beam, wherein a portion of the first and second beam paths overlap along an overlap segment, the beams in the overlap segment having a direction of propagation which is parallel to a crystalographic axis of the nonlinear crystal;
a means for receiving an optical data storage medium;
an optical transmission means for directing said second harmonic radiation from the resonator to the optical data storage medium; and
an optical reception means for receiving a return second harmonic radiation beam from the medium and for providing a data signal responsive thereto.

32. The system of claim 31, further comprising:
a plurality of cartridges containing optical data storage media;
a plurality of storage means sized to receive the cartridges; and
a movement means for moving the cartridges between the storage means and the means for receiving an optical data storage medium.

33. The system of claim 31, wherein the first and second polarization radiation beams are produced by diode lasers.

34. The system of claim 31, wherein the nonlinear crystal is a type II nonlinear crystal.

35. The system of claim 31, wherein the nonlinear crystal is comprised of KTP.

36. The system of claim 31, wherein there are four reflective surfaces.

37. The system of claim 31, wherein the first and second beam paths each have four segments and the overlap occurs along one of the segments.

38. The system of claim 31, wherein the first and second beam paths are each shaped as two intersecting triangles.

39. The system of claim 31, wherein the reflective surfaces comprise a first, second, third, and fourth reflective surfaces, the first and second reflective surfaces each having reflective planes which are parallel to one another, and the third and fourth reflective surfaces each having reflective planes which are parallel to one another.

40. The system of claim 31, wherein the reflective surfaces each have reflective planes which are nonparallel to any of the planes containing two of the crystalographic axis of the nonlinear crystal.

41. The system of claim 31, wherein the crystalographic axis is the b axis.

* * * * *